United States Patent [19]

Sugai

[11] 3,993,954
[45] Nov. 23, 1976

[54] ELECTRIC COMMUNICATION SYSTEM
[76] Inventor: Tetuya Sugai, 50-17, Gotokuji 1-chome, Setagaya, Tokyo, Japan
[22] Filed: Apr. 10, 1974
[21] Appl. No.: 459,718

[30] Foreign Application Priority Data
Nov. 9, 1973 Japan............................. 48-125439
Apr. 11, 1973 Japan............................. 48-40401

[52] U.S. Cl................................... 325/43; 178/68; 307/215; 340/347 DD
[51] Int. Cl.²............................................ H04B 7/00
[58] Field of Search............... 325/38 R, 39, 43, 44, 325/142; 332/9 R; 178/68, 26 A; 307/215, 265; 360/40; 179/15 AW; 328/58; 340/347 DD

[56] References Cited
UNITED STATES PATENTS
3,248,657   4/1966   Turecki................................ 328/55
3,461,237   8/1969   Salter.................................... 178/68
3,755,691   8/1973   Cassarino............................ 307/208

Primary Examiner—Robert L. Griffin
Assistant Examiner—Marc E. Bookbinder

[57] ABSTRACT

A data transmission system for transmitting data and subsidiary information by means of pulses of different widths corresponding to a multiple of a signal propagation time delay of a NAND gate. The system makes it possible to simplify the construction of the data transmission device to a considerable degree and at the same time to transmit data at a high speed, and includes a variety of circuits for generation and demodulation of the pulses.

17 Claims, 22 Drawing Figures

FRONT EDGE DETECTOR

REAR EDGE DETECTOR

PULSE WIDTH DETECTOR

F I G. 12
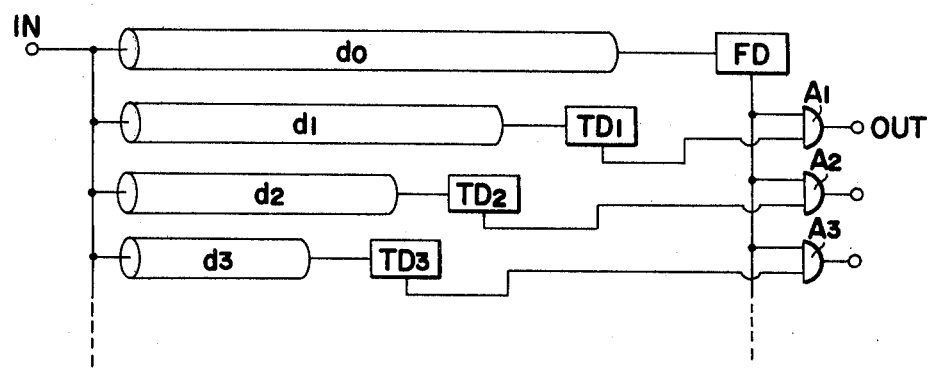
F I G. 13
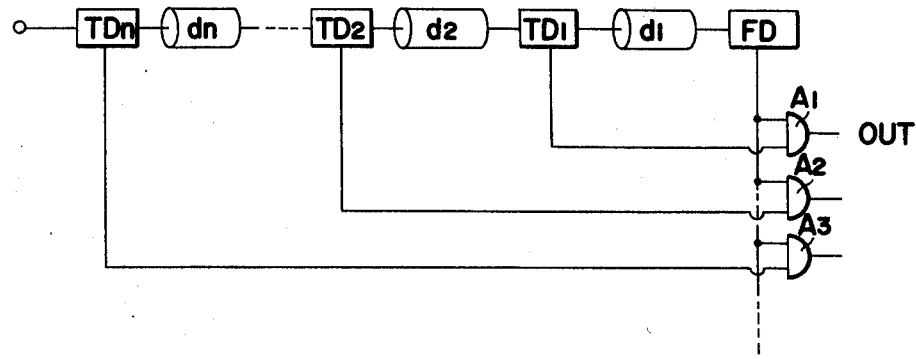

F I G. 17
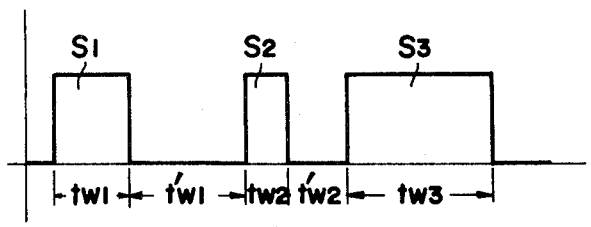
F I G. 18
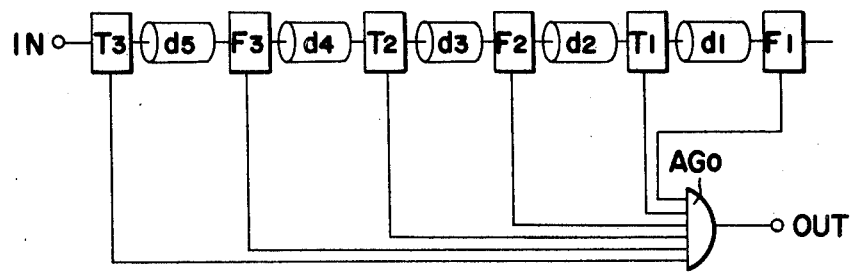

ELECTRIC COMMUNICATION SYSTEM

BACKGROUND OF THE INVENTION

1. Field of the Invention

This invention relates to an electric communication system, and more particularly to a data transmission system particularly suitable for use in the transfer of data between peripheral equipment and a computer or between two computers.

2. Description of Prior Art

In transferring data between two computers, it has been the usual practice to provide two lines between the computers for sending clock signals on one line and transferring data on the other line in terms of binary data signals of "1" and "0" which are expressed by the presence or absence of a pulse signal. The known data transmission systems of this nature are disadvantageous in that they require two transmission lines and use a unipoler pulse which necessitate use of a particular combination of a number of "1" and "0" pulses for forming a subsidiary signal such as a message start signal or the like, resulting in prohibitive complication of the circuit. On the other hand, the known asynchronous transmission systems which use a single line also require use of a complicated pulse waveform for the subsidiary signal and therefore of complicated circuit arrangement.

SUMMARY OF THE INVENTION

It is therefore an important object of the present invention to provide an electric communication system which requires only a single communication line, which allows use of a pulse of a simple waveform, and which is capable of data transmission at a high rate.

It is another object of the present invention to provide a pulse generator circuit and a demodulation circuit suitable for use in an electric communication system for generating and detecting a width-modulated pulse.

A further object of the present invention is to provide a pulse width modulator and demodulator for data transmission, which are simple in construction, low in production cost and capable of high speed data transmission.

With the above objects in view, according to the present invention, the transmission signals are modulated in width by means of a NAND gate. The modulation of the pulse width is attained by the inherent logic function of the NAND gate and by the time delay of the NAND gate which is generally called signal propagation delay or gate time.

When a pulse passes through an IC (integrated circuit) NAND gate, it usually takes a certain period of time in the order of 6 to 7 nano-seconds. This is generally called propagation delay or gate time. For example, with a NAND gate having two input terminals, if a signal "1" is supplied to both of the two input terminals, the output is "0". If one of the input terminals is supplied with a signal "0", there will be obtained an output of "1". However, even if the signal to one of the input terminals is changed from "1" to "0", the output remains "0" during the gate time gt and becomes "1" only after lapse of the gate time $gt$.

In this connection, if a plural number ($n$) of NAND gates are connected in series, the first NAND gate assumes a transient or error state upon change of its input signal until termination of the gate time $gt$. When $gt < t < 2gt$ where $t$ is a time lapse after change of the input signal of the first NAND gate, the first NAND gate is in a normal state but the second NAND gate is in a transient or error state. Similarly, when $(n-1) gt < t < ngt$, a NAND gate in the $n-1$ position and all the preceeding NAND gates are in a normal state but a NAND gate in the $n$ position is in a transient or error state. In this manner, the NAND gates successively assume a transient or error state as time lapses.

Under these circumstances, if the gate connection is effected in such a manner as to supply the input signal of the first NAND gate also to the fourth NAND gate, output pulses with a width of $3gt$ will appear at the output terminals of the fourth and the succeeding NAND gates. Likewise, if the input signal of the first NAND gate is supplied also to an input terminal of a sixth NAND gate, an output pulse having a width of $5gt$ will appear at the output terminals of the sixth and succeeding NAND gates. In this manner, by connecting an input of the first NAND gate to an input terminal of a NAND gate in a $2m$ position (where $m$ is a positive integer), there will be produced a pulse having a width of $(2m-1)gt$ at the output terminal of NAND gates in the $2m$ and succeeding positions. In this instance, there are always an even number of NAND gates expressed by $(2m-2) = 2(m-1)$ between the first NAND gate and the $2mth$ NAND gate. In this manner, with a series connection of a number of NAND gates, it is possible to obtain quite easily a pulse having a width corresponding to the gate time gt as multiplied by an odd number. In this instance, if there are odd number of NAND gates between the first $n-th$ NAND gates, no pulses will be obtained from any one of the NAND gates even if the input signal of the first NAND gate is fed to an input terminal of a $n-th$ NAND gate.

The present invention is based on these discoveries and contemplates to effect pulse width modulation and pulse demodulation with use of the logic functions and gate time characteristics of the NAND gates.

According to the present invention, the data signals "0" and "1" are transmitted, for example, in terms of pulses having 3 and 5 gate time widths, respectively, while a start signal is transmitted in the form of a pulse having a 7 gate time width. The receiver can easily demodulate these signals into data signal "0" and "1" and a start signal. As no synchronization is required, there is no need for transmission of a clock signal which would necessitate the provision of an additional transmission line. Furthermore, owing to the absence of complicated internal processing, a high rate data transmission is possible.

In addition to the foregoing advantages, the gate circuit combination allows easy detection of a pulse waveform edge and can provide detection circuitry which is far simpler than the known counterparts using a differential circuit and which is small in detection delay and relatively free from influences of noises. The width-modulated pulse can easily be detected or demodulated with use of a combination of the just-mentioned pulse waveform edge detector and a delay line circuit.

In the present invention, a series of a number of pulses with the different widths are sorted with use of a variety of detection circuits each comprising a pulse waveform edge detector and a delay line circuit. This demodulation system is capable of discriminating and detecting pulses of specific waveforms which are used for a variety of codes.

BRIEF DESCRIPTION OF THE DRAWINGS

The above and other objects, features and advantages of the invention will become apparent from the following description of preferred embodiments of the invention and the appended claims, taken in conjunction with the accompanying drawings, wherein:

FIGS. 12 and 13 are circuit diagrams of a width-modulated pulse demodulator according to the present invention;

FIG. 17 is a graphical illustration of pulses of some specific waveforms; and

FIG. 18 is a circuit diagram of a demodulator for the pulses of the specific waveforms as shown in FIG. 17.

DETAILED DESCRIPTION OF THE INVENTION

Figure 1A:
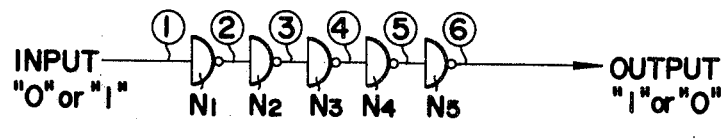
FIG. 1a is a circuit diagram showing a number of NAND gates connected in series and employed for explaining operations by the NAND gates.

FIG. 1a is employed for explaining general operations of NAND gates $N_1$ to $N_5$ which are connected in series, wherein if a signal "0" is fed to the input terminal 1, a signal "1" appears at the output terminal 2, with a signal "0" at the output terminals 3 and 5 and a signal "1" at the output terminals 4 and 6. On the other hand, if the signal at the input terminal 1 is "1", the signal at the output 2, 4 and 6 is "0" while the signal at the output terminals 3 and 5 is "1". In this manner, the circuit of FIG. 1a operates according to the inherent theories of the NAND gate in its normal state. However, a detailed study will reveal that the signals at the respective output terminals change as shown in Table 1a below since each NAND gate has a transient time or a gate time of about 6 to 7 nano-seconds.

TABLE 1a

| Time \ Terminals | 1 | 2 | 3 | 4 | 5 | 6 | |
|---|---|---|---|---|---|---|---|
| A | 0 | 1 | 0 | 1 | 0 | 1 | ← Initial state |
| $t_0$ | 1 | 1 | 0 | 1 | 0 | 1 | |
| $t_1$ | 1 | 0 | 0 | 1 | 0 | 1 | |
| $t_2$ | 1 | 0 | 1 | 1 | 0 | 1 | |
| $t_3$ | 1 | 0 | 1 | 0 | 0 | 1 | |
| $t_4$ | 1 | 0 | 1 | 0 | 1 | 1 | |
| $t_5$ | 1 | 0 | 1 | 0 | 1 | 0 | ← Normal state |

⌐⌐⌐: Error state $t_0$ : A time point when the signal at input terminal 1 changes from "0" to "1".

$t_1 = t_0 + gt$ ($gt$: gate time)
$t_2 = t_1 + gt$
$t_3 = t_2 + gt$
$t_4 = t_3 + gt$
$t_5 = t_4 + gt$
$t_i = t_{i-1} + gt$ More particularly, even if the signal at the input terminal 1 is changed from "0" to "1", the NAND gate $N_1$ keeps producing an output of "1" during the gate time $gt$ and thus is in an error state, producing an output of "0" only after lapse of the gate time $gt$. With $gt < t < 2gt$ where $t$ is a time lapse after the signal at the input terminal 1 has changed from "0" to "1", the NAND gate $N_2$ is an error state and a normal output of "0" is produced at the output terminal 6 only after a lapse of $5gt$ (number of NAND gates $x$ gate time ($gt$)).

Figure 1B:
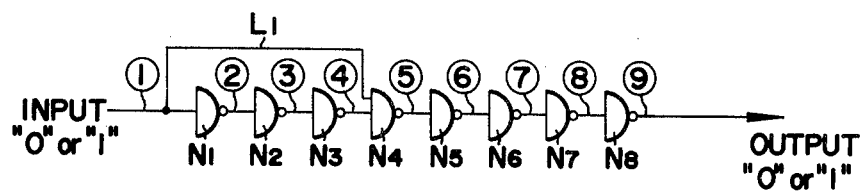
FIG. 1b is a diagram showing a particular NAND gate connection and employed for explaining the principles underlying the concept of the present invention.

Referring to FIG. 1b which shows a particular NAND gate connection for explaining the principles underlying the concept of the present invention, the NAND gates $N_1$ to $N_8$ are connected in series and connection is made such that the input signal of the first NAND gate $N_1$ is fed to the fourth NAND gate $N_4$. In this circuit arrangement, the input terminal $L_1$ of the fourth NAND gate $N_4$ is always fed with a signal of the level same as the input terminal 1, the respective output signals assuming the levels as shown in Table 1b below. Row A is the initial state. Row B indicates the state when connection $L_1$ is made between 1 and the other input to $N_5$ and with the signal at terminal 1 at "0". Then at $t_0$ the signal at 1 is changed from "0" to "1".

TABLE 1b

| Time \ Terminal | 1 | 2 | 3 | 4 | 5 | 6 | 7 | 8 | 9 | |
|---|---|---|---|---|---|---|---|---|---|---|
| A | 0 | 1 | 0 | 1 | 0 | 1 | 0 | 1 | 0 | ← Initial state |
| B | 0 | 1 | 0 | 1 | 1 | 0 | 1 | 0 | 1 | |
| $t_0$ | 1 | 1 | 0 | 1 | 1 | 0 | 1 | 0 | 1 | |
| $t_1$ | 1 | 0 | 0 | 1 | 0 | 0 | 1 | 0 | 1 | |
| $t_2$ | 1 | 0 | 1 | 1 | 0 | 1 | 1 | 0 | 1 | |
| $t_3$ | 1 | 0 | 1 | 0 | 0 | 1 | 0 | 0 | 1 | |
| $t_4$ | 1 | 0 | 1 | 0 | 1 | 1 | 0 | 1 | 1 | |
| $t_5$ | 1 | 0 | 1 | 0 | 1 | 0 | 0 | 1 | 0 | |
| $t_6$ | 1 | 0 | 1 | 0 | 1 | 0 | 1 | 1 | 0 | |
| $t_7$ | 1 | 0 | 1 | 0 | 1 | 0 | 1 | 0 | 0 | |
| $t_8$ | 1 | 0 | 1 | 0 | 1 | 0 | 1 | 0 | 1 | ⌐ Normal state |
| $t_9$ | 1 | 0 | 1 | 0 | 1 | 0 | 1 | 0 | 1 | |

⌐⌐⌐: Error state $t_0$ : A time point when the signal at input terminal 1 changes from "0" to "1".

$t_1 = t_0 + gt$ ($gt$: gate time)
$t_2 = t_1 + gt$
$t_7 = t_6 + gt$

☐ : Pulse (width = $3gt$)

As will be seen from Table 1b, by connecting the signal at the input terminal of the first NAND gate $N_1$ to the input terminal of the fourth NAND gate $N_4$, a pulse with a width of $3qt$ is obtained at the output terminals of NAND gate $N_4$ to $N_8$. Similarly, if the input of the first NAND gate is connected to an input terminal of a NAND gate $N_{2m}$ in a $2m$-th position (where $m$ is a positive integer), there will be obtained a pulse having a width of $(2m - 1)qt$ at the output terminals of the NAND gates in the $2m$-th and succeeding positions.

Figure 1C:
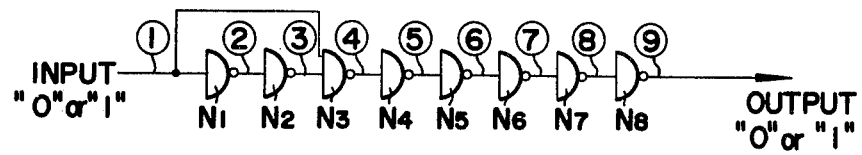
FIG. 1c is a view similar to FIG. 1b.
Figure 1D:
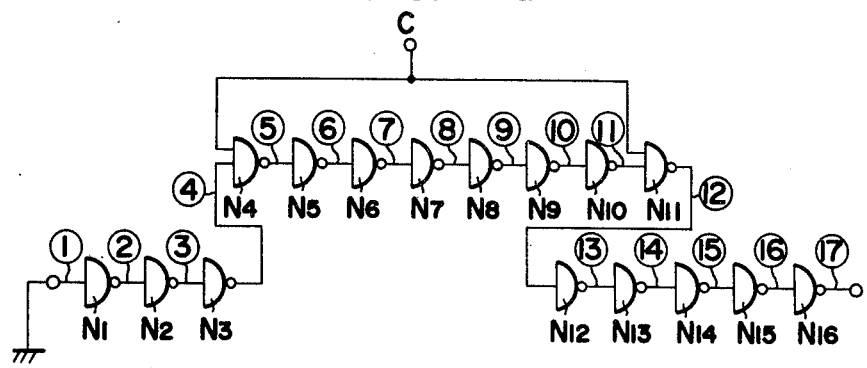
FIGS. 1d and 2 are circuit diagrams of a pulse waveform generator for producing a width-modulated pulse.

However, if the input of the first NAND gate $N_1$ is connected to a NAND gate $N_{2m-1}$ in an odd number position, there will be obtained no pulses at the output terminals of the respective NAND gates, as shown in FIG. 1c where the input of the first NAND gate $N_1$ is connected to the third NAND gate $N_3$. In this instance, the levels of the signals at the output terminals of the respective NAND gates are as shown in Table 1c below. A is the initial state. B is the state when the input from 1 is connected to one of the inputs to gate $N_3$.

of FIG. 1d showing a transmission pulse generator employed in the present invention, there are designated at $N_1$ to $N_{16}$ a number of NAND gates which are connected in series and which are preferably provided in the form of an integrated circuit. Indicated at C is a terminal for a binary state control signal, which is connected to one of the input terminals of NAND gates $N_4$ and $N_{11}$ which have interposed therebetween an even number of similar NAND gates $N_5$ to $N_{10}$. The input terminal of the NAND gate $N_1$ of the first stage is grounded and an output is taken from the output terminal of NAND gate $N_{16}$ of the last stage. Each NAND gate has a plural number of input terminals, but those NAND gates which receive input signals by way of a single input terminal, like NAND gates $N_1$, $N_2$ and the like, have their input terminals connected to each other to operate as an inverter.

In the pulse waveform generator of FIG. 1d, the outputs of the respective NAND gates undergo level changes as shown in Table 1d below, wherein the character A indicates an initial state where a signal "1" has been applied to the control signal terminal C while B indicates a final state of after output when the control signal is changed to "0" at time $t_0$.

TABLE 1d

|     | 1 | 2 | 3 | 4 | 5 | 6 | 7 | 8 | 9 | 10 | 11 | 12 | 13 | 14 | 15 | 16 | 17 |                  |
|-----|---|---|---|---|---|---|---|---|---|----|----|----|----|----|----|----|----|------------------|
| A   | 0 | 1 | 0 | 1 | 0 | 1 | 0 | 1 | 0 | 1  | 0  | 1  | 0  | 1  | 0  | 1  | 0  | ← Initial state  |
| $t_0$ | 0 | 1 | 0 | 1 | 0 | 1 | 0 | 1 | 0 | 1  | 0  | 1  | 0  | 1  | 0  | 1  | 0  |                  |
| $t_1$ | 0 | 1 | 0 | 1 | 1 | 1 | 0 | 1 | 0 | 1  | 0  | 1  | 0  | 1  | 0  | 1  | 0  |                  |
| $t_2$ | 0 | 1 | 0 | 1 | 1 | 0 | 0 | 1 | 0 | 1  | 0  | 1  | 0  | 1  | 0  | 1  | 0  |                  |
| $t_3$ | 0 | 1 | 0 | 1 | 1 | 0 | 1 | 1 | 0 | 1  | 0  | 1  | 0  | 1  | 0  | 1  | 0  |                  |
| $t_4$ | 0 | 1 | 0 | 1 | 1 | 0 | 1 | 0 | 0 | 1  | 0  | 1  | 0  | 1  | 0  | 1  | 0  |                  |
| $t_5$ | 0 | 1 | 0 | 1 | 1 | 0 | 1 | 0 | 1 | 1  | 0  | 1  | 0  | 1  | 0  | 1  | 0  |                  |
| $t_6$ | 0 | 1 | 0 | 1 | 1 | 0 | 1 | 0 | 1 | 0  | 0  | 1  | 0  | 1  | 0  | 1  | 0  |                  |
| $t_7$ | 0 | 1 | 0 | 1 | 1 | 0 | 1 | 0 | 1 | 0  | 1  | 1  | 0  | 1  | 0  | 1  | 0  |                  |
| B   | 0 | 1 | 0 | 1 | 1 | 0 | 1 | 0 | 1 | 0  | 1  | 1  | 0  | 1  | 0  | 1  | 0  | ← Normal state   |

⌐ ¬: Error state
 ⌐ ⌐

TABLE 1c

| Terminal<br>Time | 1 | 2 | 3 | 4 | 5 | 6 | 7 | 8 | 9 |                |
|------------------|---|---|---|---|---|---|---|---|---|----------------|
| A                | 0 | 1 | 0 | 1 | 0 | 1 | 0 | 1 | 0 | ← Initial state |
| B                | 0 | 1 | 0 | 1 | 0 | 1 | 0 | 1 | 0 |                |
| $t_0$            | 1 | 1 | 0 | 1 | 0 | 1 | 0 | 1 | 0 |                |
| $t_1$            | 1 | 0 | 0 | 1 | 0 | 1 | 0 | 1 | 0 |                |
| $t_2$            | 1 | 0 | 1 | 1 | 0 | 1 | 0 | 1 | 0 |                |
| $t_3$            | 1 | 0 | 1 | 0 | 0 | 1 | 0 | 1 | 0 |                |
| $t_4$            | 1 | 0 | 1 | 0 | 1 | 1 | 0 | 1 | 0 |                |
| $t_5$            | 1 | 0 | 1 | 0 | 1 | 0 | 0 | 1 | 0 |                |
| $t_6$            | 1 | 0 | 1 | 0 | 1 | 0 | 1 | 1 | 0 |                |
| $t_7$            | 1 | 0 | 1 | 0 | 1 | 0 | 1 | 0 | 0 |                |
| $t_8$            | 1 | 0 | 1 | 0 | 1 | 0 | 1 | 0 | 1 | ↓ Normal state |
| $t_9$            | 1 | 0 | 1 | 0 | 1 | 0 | 1 | 0 | 1 |                |

⌐ ¬: Error state $t_0$ : A time point when the signal at input terminal 1 changes from "1" to "1".
$t_1 = t_0 + qt$ (gate time)
$t_2 = t_1 + qt$
$t_3 = t_2 + qt$
⋮
$t_7 = t_6 + qt$ As will be understood from Table 1c, where the input of the first NAND gate $N_1$ is connected to a NAND gate $N_{2m-1}$ in an odd number position, no pulses are formed at the respective output terminals of the NAND gates.

The instant invention will now be described more particularly with reference to the accompanying drawings which show by way of example preferred embodiments of the invention. Referring to the block diagram More particularly, in the state A, the gate $N_1$ which has an input "0" produces an output "1" at the terminal 2, the gate $N_2$ which has an input "1" produces an output "0" at the terminal 3, the gate $N_3$ which has an input "0" produces an output "1" at the terminal 4, and the gate $N_4$ which has inputs "1" and "1" produces an output "0" at its terminal 5. In a similar manner, the other NAND gates $N_5$ to $N_{16}$ produce outputs of "1" and "0" as indicated to the right of "State A" in Table 1d above. When the input on the control signal terminal C is changed to "0" at time $t_0$ and after lapse of the time $t_1$ to $t_7$, the respective NAND gates finally produce outputs "1" and "0" as shown to the right of "State B" in Table 1d. When the control signal, on the other hand, is changed from "0" to "1", the respective output terminals undergo transitive or transitional states as indicated from $t_0$ to $t_{12}$ in Table 2 below before they assume the final state A. The state $t_{13}$ is same as the final state A. As mentioned hereinbefore, a change in an input signal of a NAND gate produces a change in its output only after a lapse of the so-called gate time, due to the propagation delay which is usually in the order of 6 to 7 nano-seconds. The change in the control signal to the NAND gates $N_4$ and $N_{11}$ is transferred to a NAND gate of a succeeding stage after lapse of the gate time, establishing the varying states of the output as shown from $t = 1$ to 7 of Table 1d and $t = 1$ to 13 of Table 2.

TABLE 2

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| B | 0 | 1 | 0 | 1 | 1 | 0 | 1 | 0 | 1 | 0 | 1 | 1 | 0 | 1 | 0 | 1 | 0 |
| $t_0$ | 0 | 1 | 0 | 1 | 1 | 0 | 1 | 0 | 1 | 0 | 1 | 1 | 0 | 1 | 0 | 1 | 0 |
| $t_1$ | 0 | 1 | 0 | 1 | 0 | 0 | 1 | 0 | 1 | 0 | 1 | 0 | 0 | 1 | 0 | 1 | 0 |
| $t_2$ | 0 | 1 | 0 | 1 | 0 | 1 | 1 | 0 | 1 | 0 | 1 | 0 | 1 | 1 | 0 | 1 | 0 |
| $t_3$ | 0 | 1 | 0 | 1 | 0 | 1 | 0 | 0 | 1 | 0 | 1 | 0 | 1 | 0 | 0 | 1 | 0 |
| $t_4$ | 0 | 1 | 0 | 1 | 0 | 1 | 0 | 1 | 1 | 0 | 1 | 0 | 1 | 0 | 1 | 1 | 0 |
| $t_5$ | 0 | 1 | 0 | 1 | 0 | 1 | 0 | 1 | 0 | 0 | 1 | 0 | 1 | 0 | 1 | 0 | 0 |
| $t_6$ | 0 | 1 | 0 | 1 | 0 | 1 | 0 | 1 | 0 | 1 | 1 | 0 | 1 | 0 | 1 | 0 | 1 |
| $t_7$ | 0 | 1 | 0 | 1 | 0 | 1 | 0 | 1 | 0 | 1 | 0 | 0 | 1 | 0 | 1 | 0 | 1 |
| $t_8$ | 0 | 1 | 0 | 1 | 0 | 1 | 0 | 1 | 0 | 1 | 0 | 1 | 1 | 0 | 1 | 0 | 1 |
| $t_9$ | 0 | 1 | 0 | 1 | 0 | 1 | 0 | 1 | 0 | 1 | 0 | 1 | 0 | 0 | 1 | 0 | 1 |
| $t_{10}$ | 0 | 1 | 0 | 1 | 0 | 1 | 0 | 1 | 0 | 1 | 0 | 1 | 0 | 1 | 1 | 0 | 1 |
| $t_{11}$ | 0 | 1 | 0 | 1 | 0 | 1 | 0 | 1 | 0 | 1 | 0 | 1 | 0 | 1 | 0 | 0 | 1 |
| $t_{12}$ | 0 | 1 | 0 | 1 | 0 | 1 | 0 | 1 | 0 | 1 | 0 | 1 | 0 | 1 | 0 | 1 | 1 |
| $t_{13}$ | 0 | 1 | 0 | 1 | 0 | 1 | 0 | 1 | 0 | 1 | 0 | 1 | 0 | 1 | 0 | 1 | 0 |
| A | 0 | 1 | 0 | 1 | 0 | 1 | 0 | 1 | 0 | 1 | 0 | 1 | 0 | 1 | 0 | 1 | 0 |

As shown in Table 2, the output appearing at the output terminal 17 of the NAND gate $N_{16}$ of the last arrangement, it takes only 2 gate times to attain the state B, as shown in Table 3 below.

TABLE 3

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| A | 0 | 1 | 0 | 1 | 0 | 1 | 0 | 1 | 0 | 1 | 0 | 1 | 0 | 1 | 0 | 1 | 0 |
| $t_0$ | 0 | 1 | 0 | 1 | 0 | 1 | 0 | 1 | 0 | 1 | 0 | 1 | 0 | 1 | 0 | 1 | 0 |
| $t_1$ | 0 | 1 | 0 | 1 | 1 | 1 | 1 | 1 | 1 | 1 | 1 | 1 | 0 | 1 | 0 | 1 | 0 |
| $t_2$ | 0 | 1 | 0 | 1 | 1 | 0 | 1 | 0 | 1 | 0 | 1 | 1 | 0 | 1 | 0 | 1 | 0 |
| B | 0 | 1 | 0 | 1 | 1 | 0 | 1 | 0 | 1 | 0 | 1 | 1 | 0 | 1 | 0 | 1 | 0 | stage assumes a "1" state after the lapse of 6 gate times and, maintains this state for 7 gate times, when the output again assumes a "0" state. Thus, the output of the NAND gate $N_{16}$ is obtained in the form of a pulse having a width corresponding to 7 gate times. Pulses of a similar width can also be obtained from NAND gates $N_{14}$ and $N_{12}$. On the other hand, NAND gates $N_{15}$, $N_{13}$ and $N_{11}$ produce negative pulses of a similar width, which negative pulses have different rise time points which are separated from each other by gate times depending upon the positions of the NAND gates. It will be understood from Table 1d that, when the signal to the control signal terminal C changes from "1" to "0", no pulse output appears at the terminal 17.

The output pulse width can be varied simply by varying the number (even number) of the interposed NAND gates. For example, if the control signal is fed to NAND gates $N_4$ and $N_9$ or to NAND gates $N_4$ and $N_7$, there will be obtained an output pulse having a width of 5 gate times or 3 gate times. On the other hand, the pulse width becomes larger if an increased number of NAND gates are interposed between the two NAND gates which are connected to the control signal terminal C, the width as corresponding to the gate time as multiplied by an odd number. In the particular example shown, the width modulation of the pulse is performed only by the NAND gates $N_4$ to $N_{11}$ and the other NAND gates do not contribute to the generation of the width-modulated pulses.

The states $t_0$ to $t_7$ of Table 1d shows transitive changes which occur when the control signal is changed from "1" to "0". However, in certain cases, the circuit arrangement of FIG. 1d is inconvenient as it takes too much time.

Figure 2:
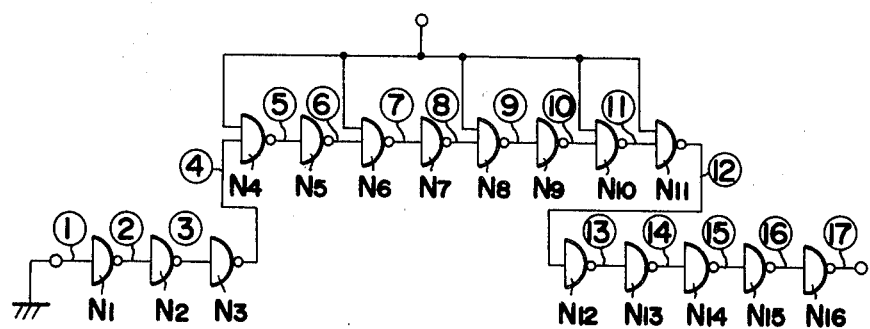

The arrangement of FIG. 2 overcomes this inconvenience, by feeding the control signal to every second NAND gate, more particularly, to NAND gates $N_6$, $N_8$ and $N_{10}$ simultaneously with gates $N_4$ and $N_{11}$. With this When the control signal is changed from "0" to "1", there occur no changes in the outputs of the NAND gates $N_6$, $N_8$ and $N_{10}$ which are fed with the control signal, as shown in FIG. 2, nor in the manner of signal propagation shown in Table 2.

With the circuit arrangement, it is possible to obtain pulses with a width corresponding to an odd multiple of the gate time of the NAND gates which are provided in the form of an integrated circuit. There is sometimes a slight difference in gate time between the individual gates but such difference may be corrected by adjusting the potential of the power supply.

Figure 3:
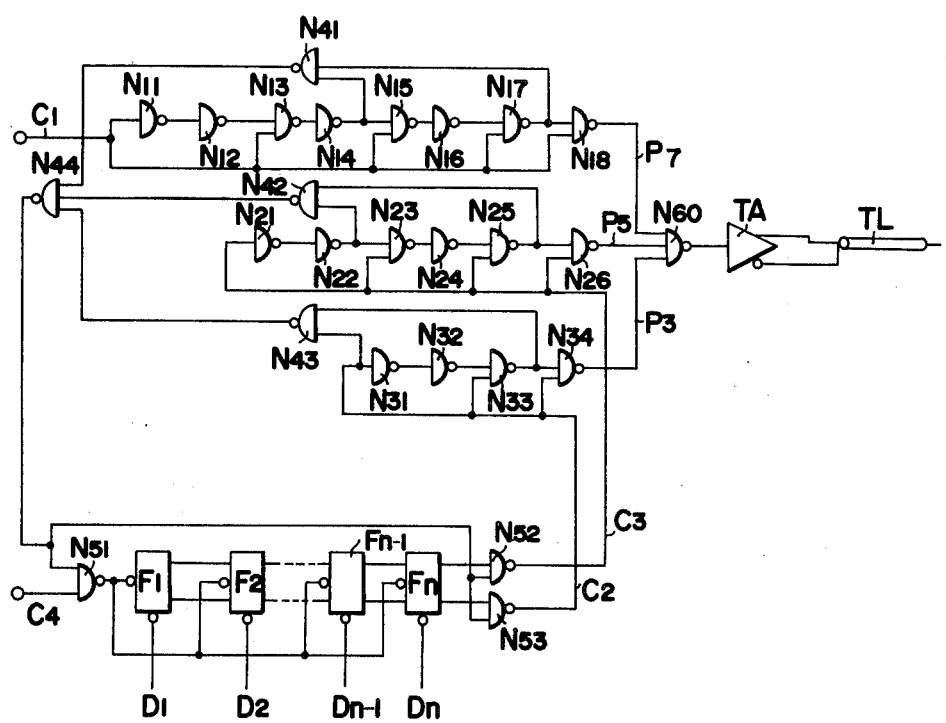
FIG. 3 is a circuit diagram of a transmitter employed in the data transmission system of the present invention.

FIG. 3 shows by way of a block diagram a data transmitter according to the invention, using the pulse generator as described hereinabove, where a series of NAND gates $N_{11}$ to $N_{18}$ constitute a pulse generator which produces pulses $P_7$ with a width of 7 gate times, according to the principles discussed hereinbefore. Similarly, a series of NAND gates $N_{21}$ to $N_{26}$ constitute a pulse generator which produces pulses $P_5$ with a width of 5 gate times and a series of NAND gates $N_{31}$ to $N_{34}$ constitute a pulse generator which produces pulses $P_3$ with a width of 3 gate times. The pulse $P_7$ is used as a start signal and is produced upon application of a control signal $C_1$. While, the pulses $P_3$ and $P_5$ are used as binary data signals "0" and "1", respectively, and are produced by control signals $C_2$ and $C_3$ which are generated in accordance with data $D_1$ to $D_n$ set in a number of flip-flop circuits $F_1$ through $F_n$. The NAND gates $N_{41}$ to $N_{43}$ produce pulses when the respective pulse generators are in transitive states for triggering the flip-flop circuits $F_1$ to $F_n$ through NAND gates $N_{44}$ and $N_{51}$. The three input terminals of the NAND gate $N_{60}$ are connected to NAND gates $N_{18}$, $N_{26}$ and $N_{34}$ forming the final stages of the respective pulse generators, while its output terminal is connected to an input terminal of an amplifier TA which is connected to a transmission line TL.

The data transmitting operation of the transmitter shown in FIG. 3 is as follows. Upon application of a start signal $C_1$, the series of NAND gates $N_{11}$ through $N_{18}$ produce a pulse $P_7$ of a 7 gate time width which is fed to a video amplifier TA through NAND gate $N_{60}$ and, after amplification thereat, is sent onto the transmission line TL. On the other hand, the binary state data $D_1$ to $D_n$ are set beforehand in the flip-flop circuits $F_1$ through $F_n$ which are triggered by the output of NAND gate $N_{41}$ which detects passage of the start signal $S_7$ as soon as the latter is transmitted, the output of the NAND gates $N_{41}$ being passed through NAND gate $N_{44}$ and $N_{51}$. The flip-flop circuits $F_1$ to $F_n$ which are adapted to act as a shift register shift data through one gate and the flip-flop circuit $F_n$ of the last stage transmits the data. If "0", the data is passed through NAND gate $N_{53}$ and, if "1", through NAND gate $N_{52}$ and appear as signal $C_2$ or $C_3$ for respectively triggering the NAND gate series $N_{31}$ to $N_{34}$ or series $N_{21}$ to $N_{26}$. Thus, there will be produced a pulse $P_3$ for the data signal "0" and a pulse $P_5$ for the data signal "1", for transmission through NAND gate $N_{60}$, amplifier TA and transmission line TL. When one bit of data is transmitted, the output of the NAND gate $N_{43}$ or $N_{42}$ is passed through the NAND gates $N_{44}$ and $N_{51}$ tp shift the flip-flop circuits $F_1$ through $F_n$ by one gate. As a result, the next and succeeding data "1" or "0" are transmitted sequentially by repeating the above operations. When all the data which has been set in the flip-flop circuits $F_1$ to $F_n$ is transmitted, all the flip-flop elements assume a "0" state and a stop signal $C_4$ is fed to the NAND gate $N_{51}$ to stop the transmission.

Figure 4:
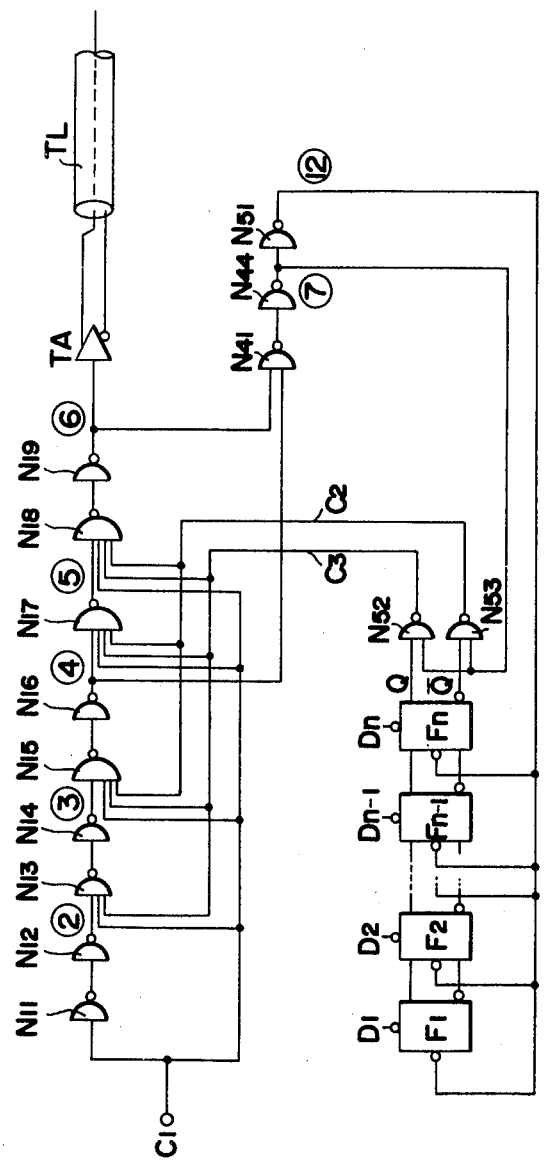
FIG. 4 is a diagram showing a modification of the circuit as shown in FIG. 1.

In the transmitter of FIG. 3, the respective pulse generators are similarly formed from series of NAND gates $N_{11}$ to $N_{18}$, $N_{21}$ to $N_{26}$ and $N_{31}$ to $N_{34}$ and, since only one of them is required to be operative at one time, they can be arranged into one series as in the transmitter shown in FIG. 4. The transmitter of FIG. 4 operates in a manner similar to the embodiment shown in FIG. 3 and involves pulses of the waveforms as shown in FIG. 5.

In order to transmit data using of the transmitter circuit arrangement of FIG. 4, the data designated by reference characters $D_1$ through $D_n$ are loaded in a suitable number of flip-flop circuits $F_1$ through $F_n$. Before starting the transmission, the signal of FIG. 4 is maintained at a low level (or 0 volt, which will be hereinafter referred to simply as L for brevity), and therefore the NAND gate $N_{44}$ has an L output while the NAND gates $N_{52}$ and $N_{53}$ have an output of a high level (or of 5 volts, which will be hereinafter referred to simply as H for brevity). The transmission is started by changing the signal $C_1$ from L to H. The series of NAND gates $N_{11}$ through $N_{18}$ of FIG. 4 corresponds to the series of NAND gates $N_{11}$ through $N_{18}$ of FIG. 3. The level change from L to H of the signal $C_1$ induces pulses of the waveforms as shown in FIG. 5 in various points of the circuit, generating a pulse of a width of 7 gate times at the output terminal 6 of the NAND gate $N_{19}$ of FIG. 4. As will be seen from the waveform diagram of FIG. 5, the output 4 of FIG. 4 undergoes a level change to H 2 gate times after a time point when $C_1$ is changed from L to H, which time point will be hereinlater referred to as a starting point for the convenience of explanation. The output 4 is combined with the output 6 to produce an output 7. Since the output 6 is changed to L 9 gate times after the starting point, the outpout at the output terminal 7 of the NAND gate $N_{44}$ is maintained at H for a period of 3 gate times. The output 7 serves to change to L the output of the NAND gate $N_{52}$ or $N_{53}$ depending upon the state of the output or the inverted output of the final stage $F_n$ of the shift register which is constituted by a number of flip-flop circuits. The output of $N_{52}$ or $N_{53}$ forms a pulse of a width of 5 gate times or of 3 gate times from the series of NAND gates $N_{13}$ to $N_{18}$ or the series of NAND gates $N_{15}$ to $N_{18}$.

Figure 5:
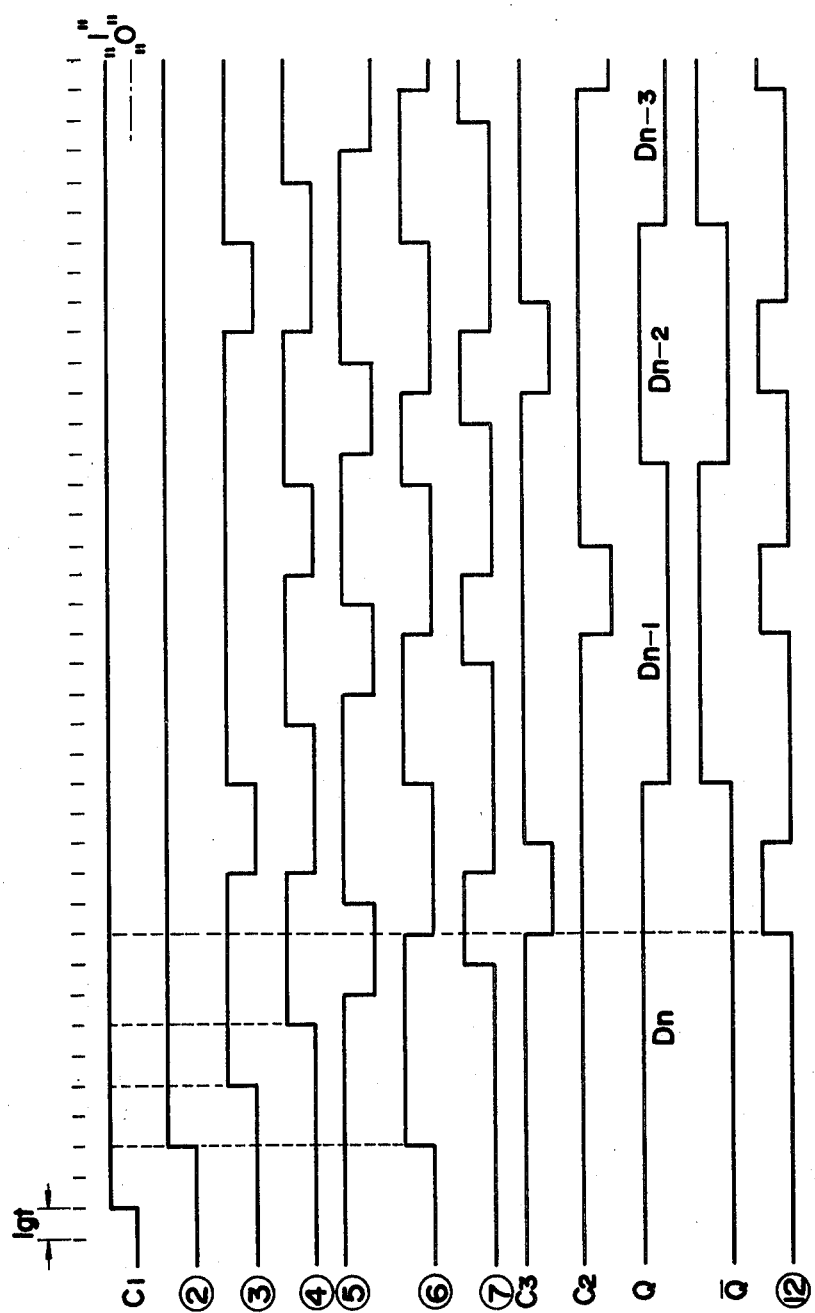
FIG. 5 is a diagram of various pulse waveforms employed for explaining operations of the circuit arrangement shown in FIG. 4.

In the timing chart shown by way of example in FIG. 5, the data $D_n$ which is to be transmitted is a "1". The series of NAND gates $N_{13}$ to $N_{18}$ undergoes changes in state to change the output from H to L, producing a pulse of 5 gate time width. This appears at the output terminal 6 at a time point 14 gate times after the starting point. Since the waveform propagate through the series of NAND gates $N_{13}$ to $N_{18}$, the potential at 4 is changed from L to H by the propagation, triggering the transmission of the next data through 7. An output which is an inversion of the output 7 appears at 12 and serves to shift the shift register which is formed from a group of flip-flop circuits $F_1$ through $F_n$.

Figure 6:
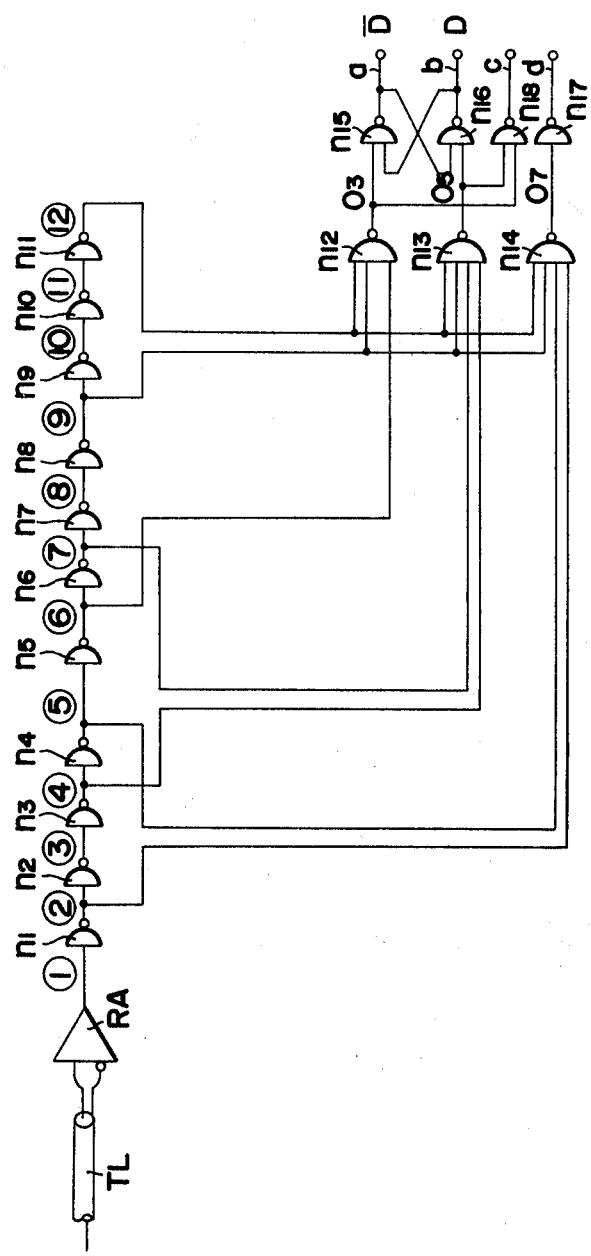
FIG. 6 is a circuit diagram of a receiver employed in the data transmission system of the invention.

FIG. 6 is a circuit diagram of a receiver, where the reference characters $n_1$ through $n_{11}$ show a series of NAND gates which are also provided in the form of integrated circuits. The first stage of the NAND gates series $n_1$ to $n_{11}$ receives a width-modulated pulse through a transmission line TL and an amplifier RA. The reference characters $n_{12}$ through $n_{18}$ also designate NAND gates, of which $n_{12}$ is connected to NAND gates $n_5$, $n_8$ and $n_{11}$, $n_{13}$ is connected to NAND gates $n_3$, $n_6$, $n_8$ and $n_{11}$, and $n_{14}$ is connected to NAND gates $n_1$, $n_4$, $n_8$ and $n_{11}$ for receiving outputs 6, 9 and 12, outputs 4, 7, 9 and 12 and outpus 2, 5, 9 and 12, respectively. The NAND gates $n_{15}$ and $n_{16}$ are respectively connected to NAND gates $n_{12}$ and $n_{13}$ and at the same time to each other to form a latching circuit. The NAND gate $n_{12}$ produces a pulse of a 3 gate time width upon receipt of a 3 gate time pulse $P_3$, while the NAND gate $n_{13}$ produces a pulse of a 3 gate time with upon receipt of a 5 gate time pulse $P_5$. The NAND gate $n_{18}$ is connected to the NAND gates $n_{12}$ and $n_{13}$ and produces a synchronizing signal C "1" (of a width of three gate times). On the other hand, the NAND gate $n_{14}$ produces a pulse of a three gate time width upon receipt of a seven gate time pulse $P_7$. This receiver circuit operates in the manner as follows.

In an input pulse of the three gate time pulse $P_3$ is received at the input terminal 1 of the first stage $n_1$ of the NAND gate series $n_1$ through $n_{11}$, the respective NAND gates outputs 2 through 12 as well as $O_3$, $O_5$ and $O_7$ undergo changes as shown in Table 4 below, where $t = 1$ shows the instant when the input pulse is imposed, and $t = 2$ and $t = 3$ show the time points after lapses of one gate time and two gate times, respectively.

TABLE 4

|   | 1 | 2 | 3 | 4 | 5 | 6 | 7 | 8 | 9 | 10 | 11 | 12 | *☐ : $O_3$ | pulse $O_5$ | $O_7$ |
|---|---|---|---|---|---|---|---|---|---|----|----|----|----|----|----|
| $t_0$ | 0 | 1 | 0 | 1 | 0 | 1 | 0 | 1 | 0 | 1 | 0 | 1 | 1 | 1 | 1 |
| $t_1$ | 1 | 1 | 0 | 1 | 0 | 1 | 0 | 1 | 0 | 1 | 0 | 1 | 1 | 1 | 1 |

TABLE 4-continued

As is clear from Table 4, if a pulse of a three gate time width is received at the input terminal 1, it appears at the output terminals of the respective NAND gates at a time delay of one gate time from a preceeding one. The outputs at the output terminals 6, 9, 12, output terminals 4, 7, 9 and 12, and output terminals 2, 5, 9 and 12 of the respective NAND gates are pulsed in the same manner as indicated at $O_3$, $O_5$ and $O_7$ of Table 4, only the output $O_3$ of the NAND gate $N_{12}$ producing an output of "0" level over a period of three gate times. In other words, when the output of the NAND gate $N_{15}$ is $a = $ "1", it is possible to know that the received signal is a three gate pulse $P_3$. In this instance, a pulse output of one gate time appears at $O_5$, however, it decays during propagation through the circuit as it has only a small duration and therefore gives no adverse effects on the ultimate output.

If a five gate time pulse $P_5$ is received at the input terminal 1 of the receiver of FIG. 6, the outputs 2 through 12 of the NAND gates $n_1$ through $n_{11}$ and outputs $O_3$, $O_5$ and $O_7$ of the NAND gates $n_{12}$ to $n_{14}$ undergo changes as shown in Table 5 below.

TABLE 5

In this instance, pulses of five gate time width appear at the output terminals of the respective NAND gates $n_1$ through $n_{11}$, at a delay of one gate time from a preceeding one. Similar to the operation with the three gate time pulse described hereinbefore, the NAND outputs at $n_{12}$, $n_{13}$ and $n_{14}$ for the outputs 6, 9, 12, outputs 4, 7, 9, 12 and outputs 2, 5, 9, 12 become as shown at $O_3$, $O_5$ and $O_7$ in Table 5, respectively, and only the NAND gate $N_{16}$ produces an output of "0" level over a period of three gate times. The outputs $O_3$ and $O_7$ decay during propagation through the circuit and therefore impose no influences on the ultimate output. Thus, when the output of the NAND gate $N_{16}$ is $b = 1$, it is known that the received input signal is the five gate time pulse $P_5$.

If a seven gate time pulse $P_7$ is received at the input terminal 1, the outputs of the respective NAND gates undergo changes as shown in Table 6 below.

TABLE 6

TABLE 6-continued

| t | 1 | 2 | 3 | 4 | 5 | 6 | 7 | 8 | 9 | 10 | 11 | 12 | *☐: pulse O₃ | O₅ | O₇ |
|---|---|---|---|---|---|---|---|---|---|----|----|----|--------------|----|----|
| $t_{12}$ | 0 | 1 | 0 | 1 | 0 | 0 | 1 | 0 | 1 | 0 | 1 | 0 | 1 | 0 | 0 |
| $t_{13}$ | 0 | 1 | 0 | 1 | 0 | 1 | 1 | 0 | 1 | 0 | 1 | 0 | 1 | 1 | 1 |
| $t_{14}$ | 0 | 1 | 0 | 1 | 0 | 1 | 0 | 0 | 1 | 0 | 1 | 0 | 1 | 1 | 1 |
| $t_{15}$ | 0 | 1 | 0 | 1 | 0 | 1 | 0 | 1 | 1 | 0 | 1 | 0 | 1 | 1 | 1 |
| $t_{16}$ | 0 | 1 | 0 | 1 | 0 | 1 | 0 | 1 | 0 | 0 | 1 | 0 | 1 | 1 | 1 |
| $t_{17}$ | 0 | 1 | 0 | 1 | 0 | 1 | 0 | 1 | 0 | 1 | 1 | 0 | 1 | 1 | 1 |
| $t_{18}$ | 0 | 1 | 0 | 1 | 0 | 1 | 0 | 1 | 0 | 1 | 0 | 0 | 1 | 1 | 1 |
| $t_{19}$ | 0 | 1 | 0 | 1 | 0 | 1 | 0 | 1 | 0 | 1 | 0 | 1 | 1 | 1 | 1 |

In this instance, it is only the NAND gate $N_{14}$ that produces an output of "0" level over a period of three gate times, so that, when the output of the NAND gate $n_{17}$ is $d =$ "1" (3 gate times), it is known that the received input signal is the seven gate time pulse $P_7$. The output $O_5$ decays during propagation through the circuit and therefore imposes no influence on the ultimate output. In general, if the output of $n_1$ is $H_2$ and the output of $n_{n-1}$ is $H_n$, and AND output of H2m, H2m + 3, H2m + 3 + w and H2m + 6 + w (where w is a natural number) forms a three gate time pulse in response to an input pulse having a width w.

It will be appreciated from the foregoing description that the use of a pulse having a width corresponding to a multiple of a gate time or a prepagation delay if IC NAND gates makes it possible to effect the generation and demodulation of pulses in an extremely simplified manner by providing a similar NAND gate group for the transmitter, allowing simplification of both transmitter and receiver circuits to a considerable degree. Furthermore, a single line suffices to effect the transmission since there is no need for the provision of a line for a clock signal, contributing to significant reductions of cabling burdens. Since the data and subsidiary information are transmitted by means of pulses of different widths which correspond to multiples of a unit gate time, it is possible to adopt multi-value logic data and to increase the kinds of subsidiary information, that is to say, to increase the number of symbols in a quite simple manner, in contrast to the known binary code system where it is required to allot to a single symbol a combination of a number of binary codes.

Though a width-modulated pulse is demodulated by the circuit of FIG. 6, the pulse demodulation may be effected also by means of a demodulator having a combination of a pulse waveform edge detector and a delay circuit.

Figure 7:
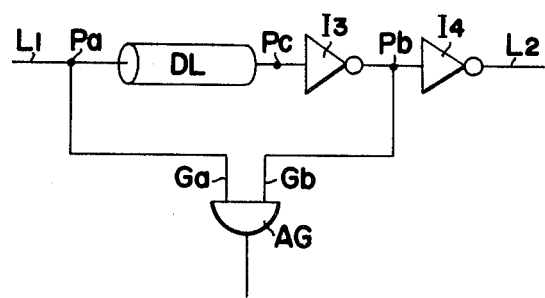
FIG. 7 is a block diagram of a pulse waveform front edge detector.

FIG. 7 shows an example of a pulse waveform front edge detector, where there is shown at $L_i$ an input signal line, at DL a delay line, at $I_3$ and $I_4$ inverters and at $L_2$ an output signal line, all connected in series in the order mentioned. Designated at AG is an AND gate which has a pair of input terminals Ga and Gb respectively connected to signal input and output terminals Pa and Pb of the series circuit of the delay line DL and the inverter $I_3$.

The circuit of FIG. 7 operates as follows. When a rectangular pulse arrives at the input signal line $L_1$ and reaches the point Pa, the level at Pa becomes "1" (a state where a signal is present) and the node Pc between the delay line DL and the Inverter $I_3$ remains "0" as the signal has not yet arrived thereat. Therefore, the level at the point Pb is held at "1" by the action of the inverter $I_3$. Thus, the AND gate AG produces an output "1" after lapse of an internal propagation time tda. When the rectangular pulse is passed to the point Pc through the delay line DL which has a signal propagation delay of $td_2$, the inverter $I_3$ produces an output "0" after a time lapse of $td_1$ while the AND gate AG produces an output "0" after a time lapse of tda. Thus, an output pulse indicating the front edge of the rectangular input pulse is obtained from the AND gate AG, which output pulse appears at a delay of tda after the time point when the input rectangular pulse reaches the point Pa and has a width corresponding to $td_2 + td_1$ which is a sum of the delays caused by the delay line DL and the inverter $I_3$. The width of the output pulse can be varied by changing the delay time of the delay line DL, to a width suitable for use in a succeeding circuit.

As the rectangular input pulse further proceeds and its rear edge is passed through the point Pa, the level at the input terminal Ga of the AND gate AG becomes "0". The AND gate AG receives inputs "0", "0" and therefore has no changes in its output "0". Upon the rear edge of the rectangular input pulse passing through the point Pc, the inverter $I_3$ produces an output "1" after a time lapse of $td_1$. However, the output of the AND gate AG remains "0" as its inputs are still "0" and "1". Thus, this circuit is insensitive to the rear edge of the input pulse and maintains the same output. In this instance, the inverter $I_4$ serves to maintain the polarity of the input and output signals unchanged, inverting again the "1" and "0" levels of the rectangular input signal which has been inverted by the inverter $I_3$ to restore the initial state. Therefore, the inverter $I_4$ may be eliminated, if unnecessary.

Figure 8:
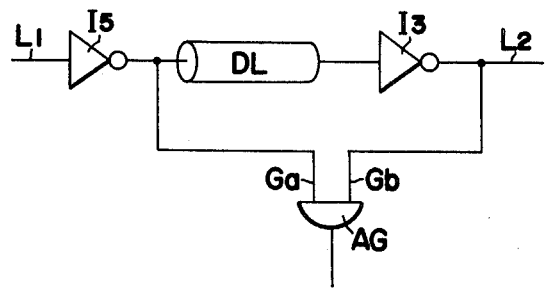
FIG. 8 is a block diagram of a pulse waveform rear edge detector.

The rear edge of the rectangular input pulse can be detected by adding an inverter. More particularly, the front edge of the rectangular input pulse resides at a point of level change from "0" to "1" while the rear edge resides at a point of level change from "1" to "0", so that the rear edge can be converted into a front edge having a level change from "0" to "1". FIG. 8 shows a rear edge detector employing an inverter $I_5$ for this purpose. It may be remarked that similar parts are designated by similar reference characters throughout the various figures. The rear edge detector of FIG. 8 operates in a manner similar to the embodiment shown in FIG. 7. Since the detector of FIG. 8 uses two inverters, there is no need for employing an additional phase inverter as shown at $I_4$ in FIG. 7.

With the front and rear edge detectors shown in FIGS. 7 and 8, the detection takes only an extremely short time corresponding to the internal signal propagation time tda of the AND gate which is in the order of several to several tens nano-seconds, so that the data transmission can be effected at an extremely high rate.

Figure 9A:
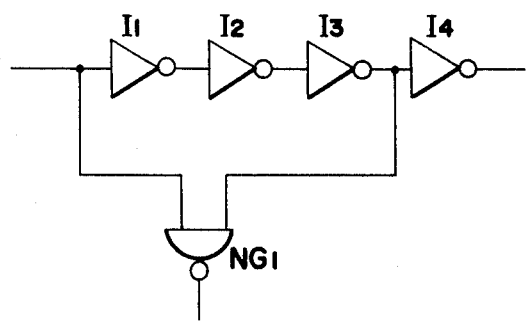
FIG. 9a is a block diagram showing one particular example of the front edge detector shown in FIG. 7.
Figure 9B:
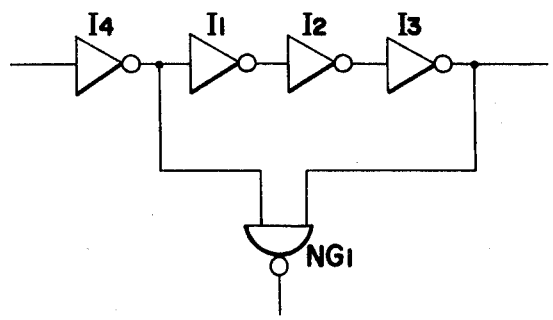
FIG. 9b is a block diagram showing one particular example of the pulse rear edge detector shown in FIG. 8.

FIGS. 9a and 9b show examples of front and rear edge detectors using IC inverters and IC NAND gates, respectively, where $I_1$, $I_2$ and $I_3$ designate inverters, and $NG_1$ designates a NAND gate. These detector circuits have the inverters $I_1$ and $I_2$ connected in series to serve as a delay element which corresponds to the delay line DL of FIGS. 7 and 8. According to experiments, all the inverters (SN 7404, SN 7400, products of Texas Instruments, Inc.) had an internal delay time of about 6 nano-seconds. Therefore, the combination of the inverters $I_1$ and $I_2$ operates as a delay element of about 12 nanoseconds. Potentials at the input terminal of the inverter $I_1$ and the output terminal of the inverter $I_3$ are connected to the NAND gate $NG_1$ to produce an AND output inverted in phase. In the particular example shown, the NAND gate $NG_1$ has an internal delay time of about 6 nano-seconds.

The front and rear edge detectors just described can carry out the detection and demodulation of width-modulated pulses in a facilitated manner and can find a variety of applications.

Figure 10:
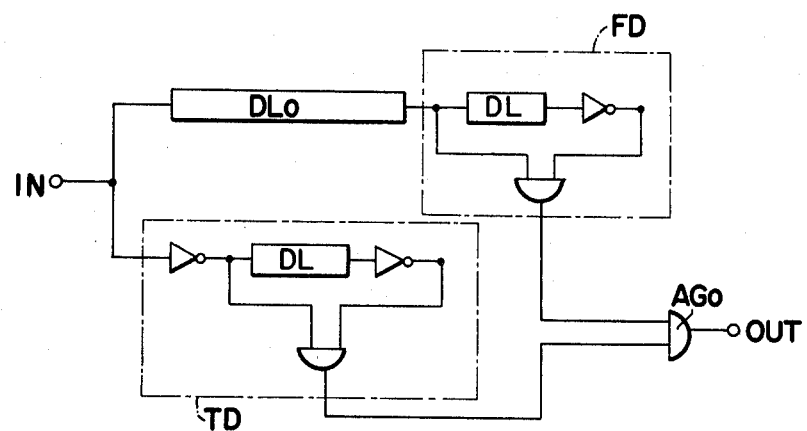
FIG. 10 is a block diagram of a circuit for detecting pulses of a predetermined width.

FIG. 10 shows an example of an application of the front and rear edge detectors, which are used in a pulse width detector for detecting a pulse of a predetermined width among a number of input pulses of different widths and where FD indicates a front edge detector as shown in FIG. 7, TD indicates a rear edge detector as shown in FIG. 8, DLo indicates a delay element having a signal propagation delay time of $td_3$ according to a pulse width to be detected, and AGo indicates an AND gate.

In this pulse width detector circuit arrangement, the front edge of a rectangular pulse received at the input terminal is passed through the delay line DLo and allowed to enter the front edge detector FD after a time lapse of $td_3$ and appears at its output terminal after a further time lapse of $tda$ as a pulse having a width corresponding to $(td_1 + td_2)$. On the other hand, the rear edge of the rectangular pulse received at the input terminal of the detector, if the pulse has a width of $tdx$, enters the rear edge detector TD after a time lapse of $tdx$ and appears as its output terminal after a further time lapse of $td_1 + tda$ as a pulse having a width corresponding to $(td_1 + td_2)$. Since the AND gate AGo produces a "1" output only when it receives input pulses simultaneously from the detectors FD and TD, the output comes from the AND gate AGo when $td_3 + tda = tdx + td_1 + tda$. Namely, if the delay line DLo has a delay time of $td_3 = tdx + td_1 = tdx$, it is possible to detect a pulse having a width corresponding to the delay time of the line DLo upon arrival thereof. As the output pulses of the front and rear edge detectors FD and TD have a width of $td_1 + td_2$, the AND gate produces a detection output even if there is a slight time deviation between the two outputs.

Figure 11:
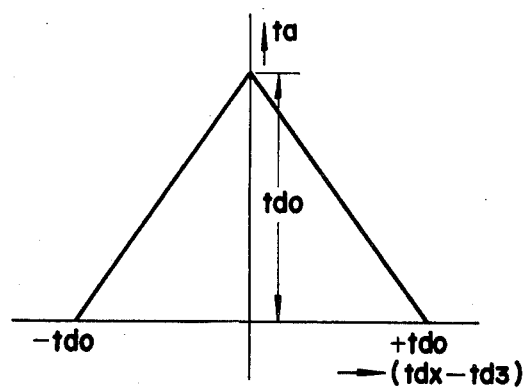
FIG. 11 is a graphical illustration explanatory of the operations of the circuit shown in FIG. 10.

When the output pulses of the front and rear edge detectors FD and TD have a width of $tdo (= td_1 + td_2)$, the output pulse of the AND gate AGo has a width ta as shown in FIG. 11. More particularly, when the width $tdx$ of the rectangular input pulse and the delay time $td_3$ of the delay element DLo coincide with each other, the output pulses of the front and rear edge detectors FD and TD are perfectly superimposed one on the other and the output pulse of the AND gate AG has a width $ta$ of a maximum value. The pulse width $ta$ becomes smaller with a larger difference between $tdx$ and $td_3$ and becomes zero when $|tdx - td_3| \geq tdo$. As a result, when pulses of different widths are received by the input terminal, the circuit detects those pulses which have a width corresponding to the delay time of the delay line DLo and produces output pulses having a width $ta$ as shown particularly in FIG. 11.

In this instance, it should be noted that, in detecting the signals, the detector of the invention does not require synchronizing signals as used in known data transmission systems, or control of auxiliary signals including reproduction of synchronizing signal after reception thereof, or the like. Therefore, the invention is completely free from such difficulties as experienced in existing counterparts, including phase shifts of synchronizing signals or complication of circuit design due to necessity for the provision of a circuit for the reproduction of synchronizing signals. This can be a great advantge in designing the transmission passage.

FIG. 12 shows an example which utilizes the aforementioned pulse width detection circuit for demodulation of width-modulated pulses, where indicated at $d_0$, $d_1$, $d_2$ and $d_3$ are delay elements having a delay time of $t_0$, $t_1$, $t_2$ and $t_3$, respectively, at FD is a front edge detector circuit, at $TD_1$, $TD_2$ and $TD_3$ are rear edge detector circuit, and at $A_1$, $A_2$ and $A_3$ are AND gates. The delay times $t_0$, $t_1$, $t_2$ and $t_3$ are selected such that they become gradually shorter from $t_1$ to $t_3$. Only four delay elements are shown in FIG. 12, however, more can be arranged in a manner similar to $d_1$, $TD_2$ and $A_1$ or $d_2$, $TD_1$ and $A_2$.

The circuit of FIG. 12 operates as follows. If a rectangular pulse arrives at the input terminal, the front edge detector circuit FD produces a detection output pulse after a time lapse of $t_0$ and this is fed to the input terminals of the AND gates $A_1$, $A_2$ and $A_3$. After the rear edge of the rectangular input pulse has passed through the input terminal, the rear edge detector circuits $TD_1$, $TD_2$ and $TD_3$ produce respective outputs with time lapses of $t_1$, $t_2$ and $t_3$, respectively. More particularly, if the rectangular input pulse has a width $tw$ and the delay element which is connected to the rear edge detector has a delay time $tx$, the AND gate produces an output when $t_0 = tw + tx$. Thus, an output is produced only from the AND gate which is connected to a rear edge detector with a delay element having a delay time $tx$. The pulse demodulation can be carried out suitably by presetting $t_1 + t_2$ and $t_3$ in accordance with the widths of the rectangular input pulses.

FIG. 13 shows a modification of the demodulator of FIG. 12, which is also adapted to demodulate width-modulated pulses. In the demodulator circuit arrangement of FIG. 13, when a front edge of a rectangular pulse of a certain width reaches the front edge detector circuit FD, the rear edge detector circuits $TD_1$ through $TD_n$ watch the rear end of the pulse and, after passage of the rear edge, an AND gate, for example, the AND gate $A_2$ which is connected to $TD_2$ produces an outputs, thus demodulating a width-modulated pulse. Of course, the delay times of the delay elements $d_1$ through $d_n$ are preset according to the widths of pulses to be demodulated.

The width-modulated pulse demodulator circuits of FIGS. 10, 12 and 13 are all adapted to produce an output only in response to reception of rectangular pulses having a variety of predetermined widths. These circuits detect reception of pulses other than of the predetermined widths but produce no outputs in response thereto. This applies to a case where an output appears only at the front edge detector FD or only at the rear edge detector TD. That is to say, it occurs when noises are produced in the communication passage. Thus, the detectors have functions to discriminate noises generated and such functions can be a great advantage in the treatment of noises in general.

Figure 14:
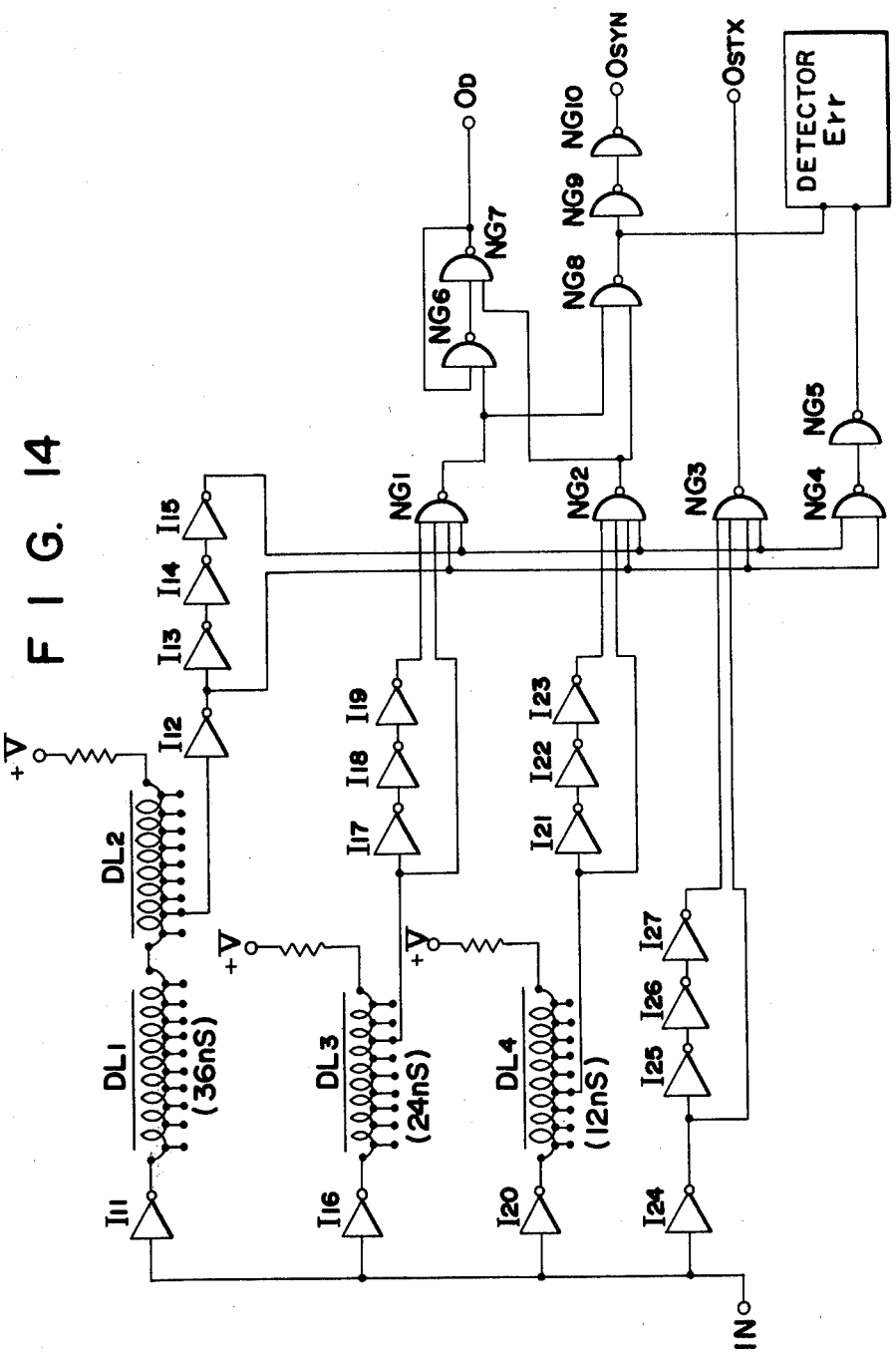
FIG. 14 is a circuit diagram showing a particular example of the demodulator shown in FIG. 12.

FIG. 14 is a circuit diagram of a receiver employing the width-modulated pulse demodulator according to the invention, where $DL_1$ and $DL_2$ indicate delay lines corresponding to the element $d_0$ of FIG. 12 and $DL_3$ and $DL_4$ indicate delay elements similarly corresponding to the elements $d_1$ and $d_2$, respectively. The example shown in FIG. 14 utilizes the fact that there occurs no change in the function of the detector circuits even if a value corresponding to $d_3$ is removed from the respective delay elements, as in FIG. 12 where no change occurs even if the respective delay times $d_0$, $d_1$, $d_2$ and $d_3$ are altered by a set value. In FIG. 14, Ii ($i = 11$ through 27) indicates inverters which are provided in the form of an integrated circuit. Inverters $I_{12}$, $I_{13}$, $I_{14}$ and $I_{15}$ constitute together with a NAND circuit $NG_1$ a front edge detector circuit which corresponds to FD of FIG. 12, while the group $I_{17}$, $I_{18}$ and $I_{19}$, group $I_{21}$, $I_{22}$ and $I_{23}$ and group $I_{25}$, $I_{26}$ and $I_{27}$ constitute, together with NAND circuits $NG_1$ to $NG_3$, rear edge detector circuits when correspond to $TD_1$, $TD_2$ and $TD_3$ of FIG. 12, respectively. The inverters of the group including $I_{13}$ and $I_{14}$, the group including $I_{17}$ and $I_{18}$, the group including $I_{21}$ and $I_{22}$ and the group including $I_{25}$ and $I_{26}$ are all connected in series to act as a delay element for imparting a suitable width to the edge detection output pulse. These inverter group corresponds to the delay line DL of FIGS. 7 and 8. In the circuit arrangement of FIG. 14, a signal undergoes phase inversion through inverters $I_{11}$, $I_{16}$, $I_{20}$ and $I_{24}$, so that the front and rear edge detectors have inverted circuit arrangements as compared with those of FIGS. 7 and 8. The NAND circuits $NG_1$ to $NG_3$ of FIG. 14 correspond to AND circuits $A_1$ and $A_3$ of FIG. 12, respectively. $NG_6$ and $NG_7$ have no counterparts in the embodiment of FIG. 12 but they constitute a flip-flop circuit for retaining data. The NAND circuits $NH_8$, $NH_9$ and $NG_{10}$ constitute a synchronizing pulse generator for the control of a shift register which is connected to the last stage. The outputs of the NAND circuits $NG_5$ and $NG_8$ are used for detecting the arrival of a noise waveform by means of a detector Err.

Figure 15:
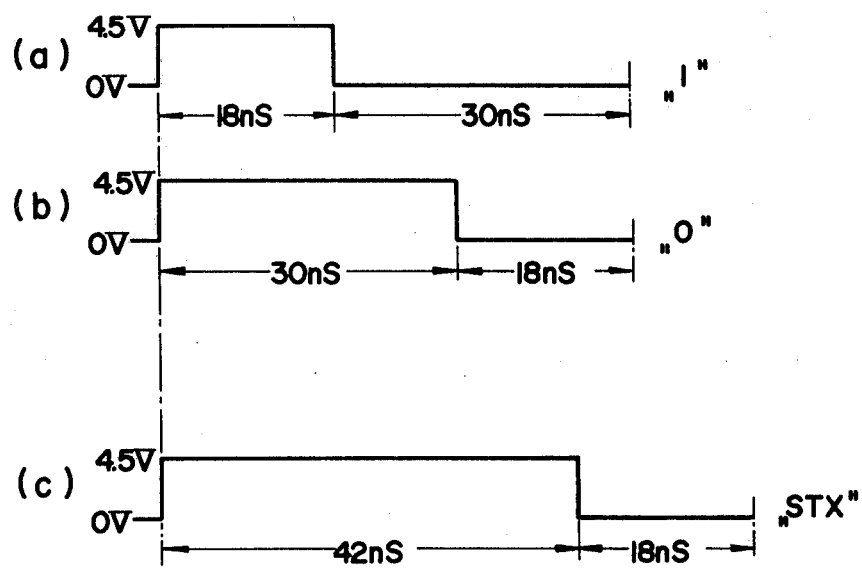
FIG. 15 is a diagram showing particular examples of waveforms of width-modulated pulses.

The waveforms ($a$), ($b$) and ($c$) of FIG. 15 are of the three pulses which are detected by the width-modulated pulse demodulator of FIG. 14. These pulse waveforms correspond to three items of information namely "1", "0" and "STX", respectively. Other pulse waveforms are detected as noises by the detector Err.

Figure 16:
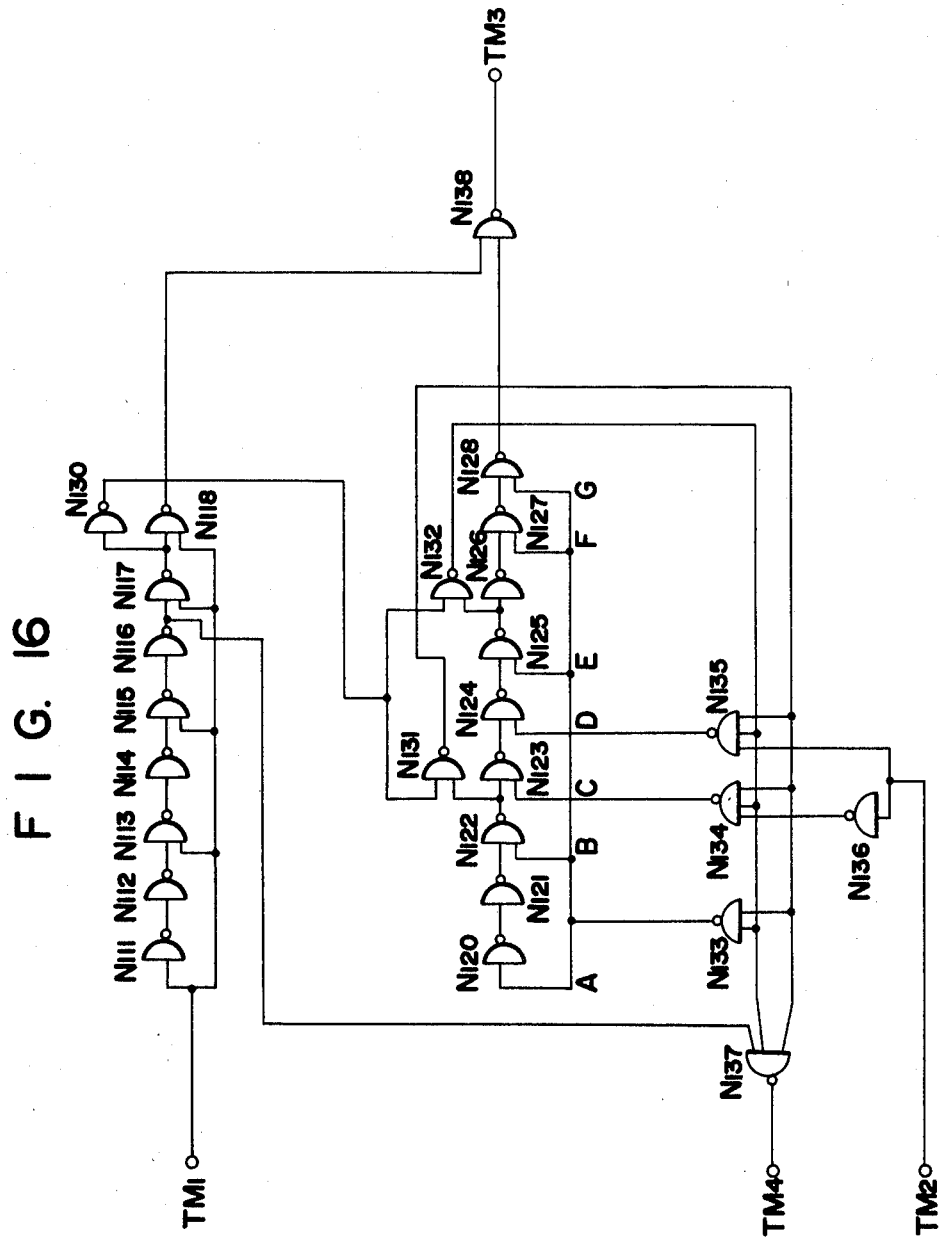
FIG. 16 is a circuit diagram for producing width-modulated pulses as shown in FIG. 15.

FIG. 16 shows an example of a pulse generator circuit for producing waveforms as shown in FIG. 15, where $N_{111}$ to $N_{118}$, $N_{120}$ to $N_{128}$ and $N_{130}$ to $N_{138}$ indicate NAND gates, respectively, $TM_1$ indicates an input terminal for a start signal, $TM_2$ indicates an input terminal for the data "1" and "0", $TM_3$ indicates an output terminal for width-modulated pulse, and $TM_4$ indicates an output terminal for a data cycle pulse. This pulse generator circuit operates in the manner as already described hereinbefore with reference to FIGS. 3 and 4. In brief, when $TM_1$ is at the L level, the circuit is in a stop state. Under these circumstances, no waveform can propagate through the series of NAND gates $N_{111}$ to $N_{118}$, holding the output of $N_{130}$ at L level and the outputs of $N_{131}$ and $N_{132}$ at H level. Since the output of $N_{133}$ is at the L level, no waveform propagates through the series of NAND gates $N_{120}$ to $N_{128}$. When the potential at $TM_1$ is changed to the H level, a pulse having a 7 gate time width is produced through $N_{118}$ for the reasons as explained hereinbefore in connection with FIGS. 1 and 2. With a time lapse of 8 gate times after the level change of $TM_1$ to H, the output of $N_{130}$ changes from L to H level. Since the outputs of $N_{122}$ and $N_{125}$ are at the H level, the outputs of $N_{131}$ and $N_{132}$ change to the L level. The process after this varies depending upon whether $TM_2$ is at the H level or at the L level. In the case where $TM_2$ is at the H level, the input terminals A to G, except for the input terminal C of the NAND gate $N_{123}$, are all at the L level before the afore-mentioned outputs of $N_{131}$ and $N_{132}$ change from H to L level. When the outputs of $N_{131}$ and $N_{132}$ change from H to L level, the input terminals A to G and $TM_4$ change from L to H level, except for the input terminal C. At this time, the NAND gates which are connected to E, F and G act as a pulse generator circuit as described in connection with FIGS. 1 and 2, producing a pulse with a 3 gate time width. With a time lapse of 2 gate times from the time point when input terminals A, B, D to G and $TM_4$ change from the L to H level, the output of $N_{132}$ changes to the H level, while $N_{131}$ changes to the H level after a time lapse of 4 gate times.

The operation then proceeds to the transmission of the next data. When $TM_2$ is at the L level, the input terminals A to G are likewise at the L level except for the terminal D which is at the H level. When the outputs of $N_{131}$ and $N_{132}$ change to the L level, the NAND gate input terminals C, E to G and $TM_4$ operate as a pulse generator circuit as discussed hereinbefore in connection with FIGS. 1 or 2, producing a pulse having a 5 gate time width. $N_{131}$ changes again to the H level with a time lapse of 4 gate times from the time point when A changes from the L to H level, while $N_{132}$ changes similarly to the H level with a time lapse of 4 gate times from the time point when C changes to the H level. Whereupon, the operation proceeds to the next data transmission cycle. By this time, the next data to be transmitted should be provided in a ready state at the output terminal $TM_2$. This can be attained by connecting the output of $TM_4$ to the shift register and the output of the shift register to $TM_2$. In this instance, depending upon whether the prepared data or the input terminal $TM_2$ is at the H level or the L level, either one of the NAND gate input terminals C and D is selected to assume the L level. $N_{132}$ changes again to the L level with a time lapse of 7 gate times from the previous level change of A from the L to H level, and, with a further time lapse of 1 gate time, causes C or D, A, B, E to G and $TM_4$ to change from the L to H level, producing through $N_{128}$ a pulse having a width corresponding to the input data. Thus, the transmission of a width-modulated pulse for the succeeding data is effected at a time interval of 5 gate times when the preceeding pulse has a width of 3 gate times and at a time interval of 3 gate times when the preceeding pulse has a width of 5 gate times. This depends on which one of the series of NAND gates, $N_{120}$ to $N_{124}$ or $N_{120}$ to $N_{122}$, is used, that is to say, upon the number of the gates involved. The pulse waveforms of FIG. 15 each has a width corresponding to a multiple by an odd number of 6 nanoseconds.

Of the waveforms of FIG. 15, the waveform ($c$) which has a width of 42 nano-seconds corresponds to an alphabet "STX", which is detected by the front edge detector of FIG. 14 including inverters $I_{13}$ to $I_{15}$ and also by the rear edge detector including inverters $I_{25}$, to $I_{27}$, to produce an output $O_{STX}$ at the NAND circuit $NG_3$. In order to get the front edge of the signal waveform ($c$) to appear on the output of the inverter $I_{12}$ simultaneously with appearance of the rear edge on the output of the inverter $I_{24}$, there should be a time difference of 42 nano-seconds between these two outputs. Where the inverter $I_{11}$ has an internal propagation delay of 6 nano-seconds, the delay line constituted by $DL_1$ and $DL_2$ is required to give a delay of 36 nano-seconds. After setting the delay time for the signal waveform of the largest width, the delay times of $DL_4$ and $DL_3$ are set at 12 nano-seconds and 24 nano-seconds, respectively, for the detection of the signal waveform of 30 nano-seconds (alphabet "0") and the signal waveform of 18 nano-seconds (alphabet "1"), the respective outputs due to arrival of a pulse appearing at the NAND circuits $NG_2$ and $NG_1$. Each of these outputs is in the form of an instantaneous pulse and stored in the flip-flop circuit which is constituted by NAND gates $NG_6$ and $NG_7$, to give an output $O_D$. The output appearing either at the NAND circuit $NG_1$ or $NG_2$ is simultaneously subjected to OR operation in the NAND circuit $NG_8$, which can be utilized as a synchronizing signal $O_{SYN}$. The "STX" output $O_{STX}$ appearing at the NAND circuit $NG_3$ serves to denote a punctuation point between the individual message (formed from two alphabets of "1" and "0").

As disclosed hereinabove, the receiver circuit of the invention is adapted to produce an output only in response to a pulse of a particular width, in a manner to allow facilitated digital transmission according to the pulse width modulation. This receiver circuit, furthermore, has a desirable property of promptly detecting the occurrence of noises, thus being effective in enhancing the promptness of counteraction against noises and improving the quality of data transmission lines. The receiver circuit, moreover, may be constructed by the use of integrated circuits. This facilitates suitable coordination of the speed of the receiver operation with that of electronic computer circuits which also comprise ICs, making the receiver suitable for use in high speed data transmission apparatus.

By combining wave edge detecting circuits and delay circuits, a pulse train of a particular waveform which train is suitable for use in various codes may easily be detected. Referring to FIG. 17 showing one example of a pulse train to be detected, the train comprises three pulses $S_1$, $S_2$ and $S_3$, respectively having a width of $tw_1$, $tw_2$ and $tw_3$. The three pulses are aligned in series, interspaced by time intervals $t'w_1$ and $t'w_2$. The pulse train comprising the three pulses thus conveys information.

Referring to FIG. 18 showing a receiver circuit, $d_1$, $d_2$, $d_3$, $d_4$ and $d_5$ denote delay elements respectively having signal propagation delay time $t_1$, $t_2$, $t_3$, $t_4$ and $t_5$, which delay time respectively correspond to pulse widths and pulse intervals $tw_1$, $t'w_1$, $tw_2$, $t'w_2$ and $tw_3$. $F_1$, $F_2$, $F_3$ denote pulse front edge detection circuits and $T_1$, $T_2$, $T_3$ denote pulse rear edge detection circuits while AGo is an AND gate which is adapted to receive outputs from said detection circuits $F_1 - F_3$ and $T_1 - T_3$. Delay lines may be suitably employed as the delay element $d_1 - d_5$. Also, a plurality of IC inverters connected in series, said inverters having suitable signal propagation delay time, may well be used as the delay elements.

Operation of the receiver circuit is now described with reference to the drawings. A pulse train as shown in FIG. 17 enters the receiver circuit at a signal input terminal. When a front edge and a rear edge of each pulse $S_1$ to $S_3$ pass through front edge detecting circuits $F_3$ to $F_2$, and rear edge detecting circuits $T_3$ to $T_2$ successively, each detecting circuit generates a pulse of a predetermined width as a result of detection. In this case, however, signals applied to the AND gate AGo are at the "1" level partially (assuming the "1" level to be the case where the front edge and the rear edge detecting circuits produce outputs) and a pulse train is not generated. When the front edge of the pulse $S_1$ is detected by the pulse front edge detection circuit, however, the rear edge of the pulse $S_1$ is detected by the rear edge detection circuit $T_1$. Similarly, the front and rear edges of the pulse $S_2$ are detected by the front and the rear edge detection circuits $F_2$ and $T_2$, and the front and the rear edges of the pulse $S_3$ are detected by the front and the rear edge detection circuits $F_3$ and $T_3$, with a result that all the input signals applied to the AND gate AGo are at the "1" level, causing the gate to generate a pulse train. When a pulse having a wave form other than the pulse train shown in FIG. 17 is applied to the input terminal, one or more of the detection circuits $F_1$ to $F_3$ and $T_1$ to $T_3$ fail to generate an output, and accordingly the AND gate AGo does not generate an output. In this manner, the receiver circuit shown in FIG. 18 discriminately detects a pulse signal of a particular waveform from various pulses applied to the input terminal.

In order to detect a pulse train having a waveform other than that shown in FIG. 17, the number of delay elements, pulse front edge and rear edge detectors as well as the delay time for the delay elements are adjusted in accordance with a number of pulses, pulse widths and pulse intervals constituting the particular pulse train to be detected.

The present invention has been disclosed in detail hereinabove with reference to preferred embodiments. Needless to say, the application of the present invention is in no way restricted to the particular embodiments illustrated susceptible to various changes and modifications or alterations within the scope of the invention as defined in the appended claims.

What is claimed is:

1. An electrical communication system for transmitting binary information by utilizing a train of width modulated pulses as the transmission signal comprising, a transmission means for converting the binary information to pulses of different widths and transmitting them, and a receiving means for receiving said pulses of different widths and decoding them, characterized in that said transmission means includes pulse generator means including at least one series of interconnected NAND gates in the form of an integrated circuit, an input circuit means coupled to said pulse generator means, said input circuit means storing said binary information and sequentially applying said binary information to said pulse generator means, for each binary bit of information said input circuit means applying a signal to the inputs of at least a first two predetermined NAND gates of said series for one binary level and of at least a second two predetermined NAND gates of said series for the other binary level, there being a different even number of NAND gates between each of said first and second two predetermined NAND gates, whereby the output pulses from said series of NAND gates will have widths dependent upon the propagation delay time of a single NAND gate multiplied by one more than said even numbers, and an output circuit means coupled to the output of said pulse generator means for transmitting said output pulses.

2. An electrical communication system as in claim 1 and wherein said series of NAND gates comprises at least one input NAND gate, at least one output NAND gate, an even number of NAND gates therebetween, and wherein said input NAND gate is coupled to said input circuit means. (FIG. 1b)

3. The system of claim 1 and wherein said pulse generator means comprises a plurality of pulse generator circuits each producing a pulse of a different width, and wherein said input circuit means comprises a shift register for storing said binary information signals, each of said different width pulses corresponding to a particular type of binary information signal, and a control circuit interconnecting said shift register with said plurality of pulse generator circuits for triggering the pulse generator circuit corresponding to the binary information signal at the output of said shift register, said control circuit shifting said register upon the transmission of said produced pulse. (FIG. 3).

4. The system of claim 3 and wherein each of said pulse generator circuits comprise an arrangement of a even number of series connected NAND gates, the number of NAND gates of each pulse generator circuit differing from the other, said shift register triggering at least the first and last NAND gates of a series upon interconnection by said control circuit; whereby the width of the pulse produced by each of said pulse generator circuits is a multiple of the propagation delay time of a NAND gate, the multiple for each generator circuit being one less than the number of NAND gates comprising that pulse generator circuit. (FIG. 3).

5. The system of claim 4 and wherein each of said pulse generator circuits is formed by utilizing an even number of consecutive NAND gates from said series of NAND gates. (FIG. 4).

6. An electrical communication system as in claim 1 and wherein said binary information represents both data signals and control signals.

7. The system as in claim 6 and wherein said pulse generator means further comprises a first pulse generator circuit having in series connection, a first plurality of NAND gates, and a second pulse generator circuit including a second series of NAND gates, and wherein said control signals include a start signal for application to the inputs of at least two predetermined NAND gates of said first plurality of NAND gates, the output of said first plurality of NAND gate being a pulse of a predetermined width, said pulse from said first plurality of NAND gates being applied to said second series of NAND gates, whereby subsequent binary bits of information can be applied to said second series of NAND gates. (FIG. 5).

8. The system of claim 6 and wherein said receiving means further comprises pulse detector means for decoding said pulses of different widths into data signals and control signals.

9. The system of claim 8 and wherein said pulse detecting means comprises a width-modulated-pulse demodulator circuit including an arrangement of series connected NAND gates formed in an integrated circuit, and a control circuit including additional NAND gates, said series arrangement receiving the pulses of different widths, and passing said pulses through said series arrangement of NAND gates, the output level of each NAND gate of said series arrangement at a given time after receiving a particular pulse being dependent upon the width of the particular pulse received, each of said additional NAND gates being respectively interconnected to the outputs of predetermined NAND gates from said series arrangement which have identical levels at given times after receiving a pulse, whereby said control circuit produces a signal depending upon the outputs of said predetermined NAND gates. (FIG. 6).

10. The system of claim 8 and wherein said pulse detector means includes a width-modulated-pulse demodulator circuit including, a plurality of delay elements each having a different delay time, each of said delay elements receiving said pulses of different widths, a front-edge-waveform detector circuit serially connected to the output of the delay element having the longest delay time, a plurality of rear-edge-waveform detector circuits each serially coupled to a respective one of the remaining delay elements, and a plurality of AND gates each having two inputs, one input of each AND gate being commonly connected to the output of said front-edge-waveform detector circuit, and the other input of each AND gate connected to a respective output of said rear-edge-waveform detector circuits. (FIG. 12).

11. The system of claim 8 and wherein said pulse detector means includes a width-modulated-pulse demodulator circuit comprising, a plurality of delay elements and a corresponding plurality of rear-edge-waveform detector circuits alternately connected in series circuit arrangement with said delay elements, said circuit arrangement commencing with a rear-edge-waveform detector circuit which receives said pulses of different widths, and said circuit arrangement terminating with a delay element, a front-edge-waveform detector circuit serially coupled to said terminating delay element, and a corresponding plurality of AND gates each having two inputs, one input of each AND gate being commonly connected to the output of said front-edge-waveform detector circuit, and the other input of each AND gate connected to a respective output of said rear-edge-waveform detector circuits. (FIG. 13).

12. The system of claim 8 and wherein said pulse detector means comprises a plurality of width-modulated-pulse demodulator circuits, each said demodulator circuit including in series, a rear-edge-waveform detector circuit, a first delay element and a front-edge-waveform detector circuit said pulse detector means further comprising a plurality of second delay elements each respectively serially interconnecting two of said demodulator circuits, each one of said first and second delay elements having a different delay time from every other delay element, and an AND circuit having a number of input terminals, a different one of said input terminals respectively connected to the outputs of each of said front-edge and rear-edge-waveform detector circuits. (FIG. 18).

13. The system of claim 8 and wherein said pulse detector means includes a width-modulated-pulse demodulator circuit comprising, a rear-edge-waveform detector, a delay element having a delay time corresponding to a width of one of said pulse of different widths, a front-edge-waveform detector in series combination with said delay elements, said rear-edge-waveform detector and said series combination both receiving said pulses of different widths, and an AND gate receiving the outputs of both said detectors, whereby said AND gate will only produce an output upon said detectors receiving a pulse whose width is substantially equal to said delay time. (FIG. 10).

14. The system of claim 13 and wherein said front-edge-waveform detector produces a pulse of a predetermined width upon detecting the front-edge of a waveform, and includes, delay means, an inverter in series with said delay means, and an AND gate having two input terminals, one of which is connected to the input of said delay means and the other of which is connected to the output of said inverter. (FIG. 7)

15. The system of claim 14 and wherein said delay means and said inverter are formed of NAND gates in the form of an integrated circuit. (FIG. 9a).

16. The system of claim 13 and wherein said rear-edge-waveform detector produces a pulse of a predetermined width upon detecting the rear-edge of a waveform, and includes in series combination, a first inverter, a delay means and a second inverter, and further includes and AND gate having two input terminals, one of which is connected to the input to said delay means and the other of which is connected to the output of said second inverter. (FIG. 8).

17. The system of claim 16 and wherein said delay means and said first and second inverters are formed of NAND gates in the form of an integrated circuit. (FIG. 9b).

* * * * *